Figure 1:
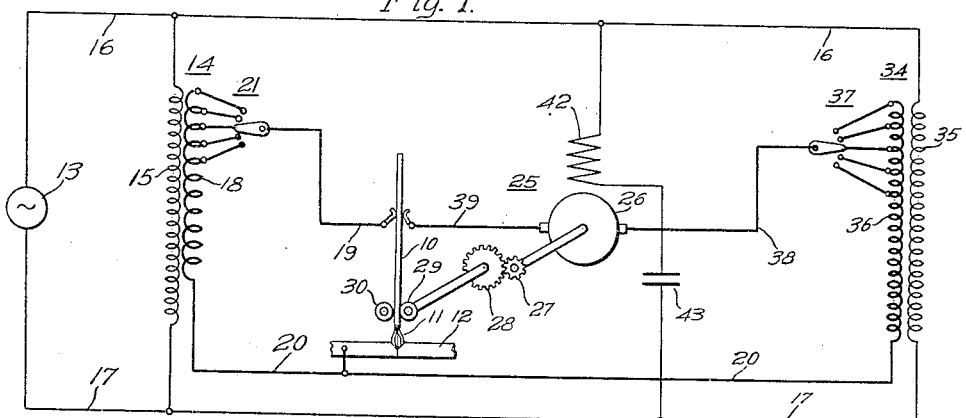

July 16, 1935.   J. H. BLANKENBUEHLER ET AL   2,008,411
ARC WELDING APPARATUS
Filed Aug. 5, 1933    2 Sheets-Sheet 1

WITNESSES:

INVENTORS.
John H. Blankenbuehler &
Oliver C. Schoenfeld.
BY
ATTORNEY

July 16, 1935.  J. H. BLANKENBUEHLER ET AL  2,008,411
ARC WELDING APPARATUS
Filed Aug. 5, 1933   2 Sheets-Sheet 2

WITNESSES:
C. J. Weller.
R. R. Lockwood

INVENTORS.
John H. Blankenbuehler &
Oliver C. Schoenfeld.
BY G. M. Crawford
ATTORNEY Patented July 16, 1935

2,008,411

UNITED STATES PATENT OFFICE 2,008,411

ARC WELDING APPARATUS

John H. Blankenbuehler, Edgewood, and Oliver C. Schoenfeld, Irwin, Pa., assignors to Westinghouse Electric & Manufacturing Company, East Pittsburgh, Pa., a corporation of Pennsylvania Application August 5, 1933, Serial No. 683,812

13 Claims. (Cl. 219—8)

Our invention relates, generally, to arc welding apparatus and it has particular relation to automatic arc welding apparatus.

The object of our invention, generally stated, is to provide automatic arc welding apparatus which shall be simple and efficient in operation and which may be readily and economically manufactured and installed.

The principal object of our invention is to provide for regulating the rate at which an arc welding electrode is fed relative to work in accordance with an alternating-current voltage maintained across the welding electrode and the work to maintain a substantially constant arc voltage.

A more specific object of our invention is to provide for feeding a welding electrode in accordance with an alternating-current arc voltage by means of a directly connected reversible alternating-current motor to maintain a substantially constant arc voltage.

Another object of our invention is to provide for shifting the phase relation of the flux generated by a separately excited winding of an alternating-current motor to provide sufficient torque for the operation of the motor.

Still another object of our invention is to provide for utilizing an alternating-current motor of the commutator type for feeding a welding electrode relative to work to maintain a substantially constant arc voltage.

Another object of our invention is to provide for utilizing an alternating-current motor of the polyphase squirrel-cage type for feeding a welding electrode relative to work to maintain a substantially constant arc voltage.

Still another object of our invention is to provide for amplifying the difference between the arc voltage maintained between a welding electrode and work and a fixed voltage and employing the amplified difference in voltage for regulating the rate at which an alternating-current motor feeds the welding electrode relative to the work to maintain a substantially constant arc voltage.

Other objects of our invention will in part be obvious and in part appear hereinafter.

Our invention, accordingly, is disclosed in the embodiment hereof shown in the accompanying drawings and comprises the features of construction, the combination of elements and arrangement of parts which will be exemplified in the construction hereinafter set forth and the scope of the application of which will be indicated in the appended claims.

Figure 2:
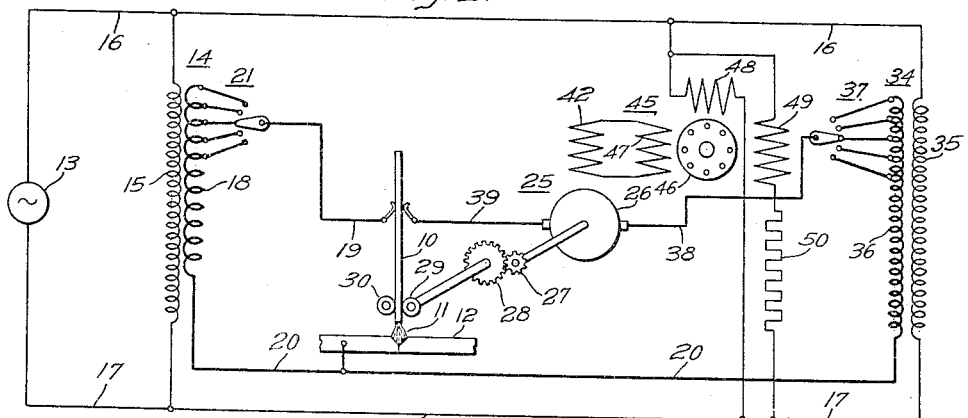
Figure 3:
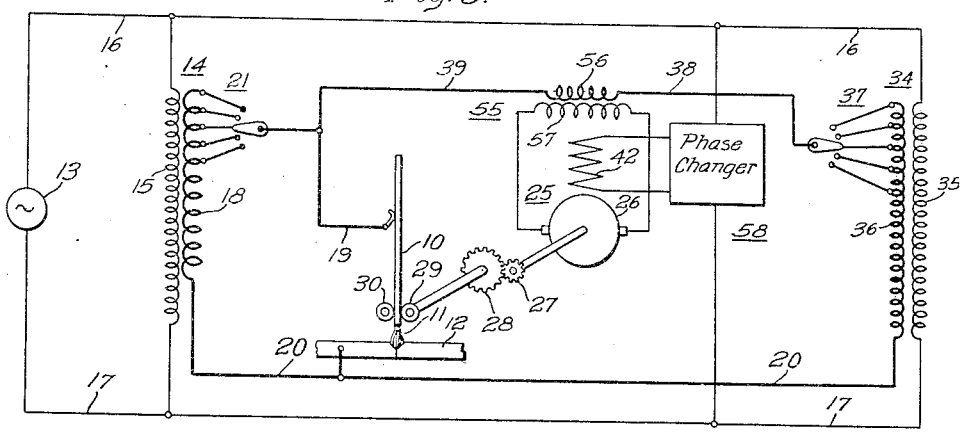
Figure 4:
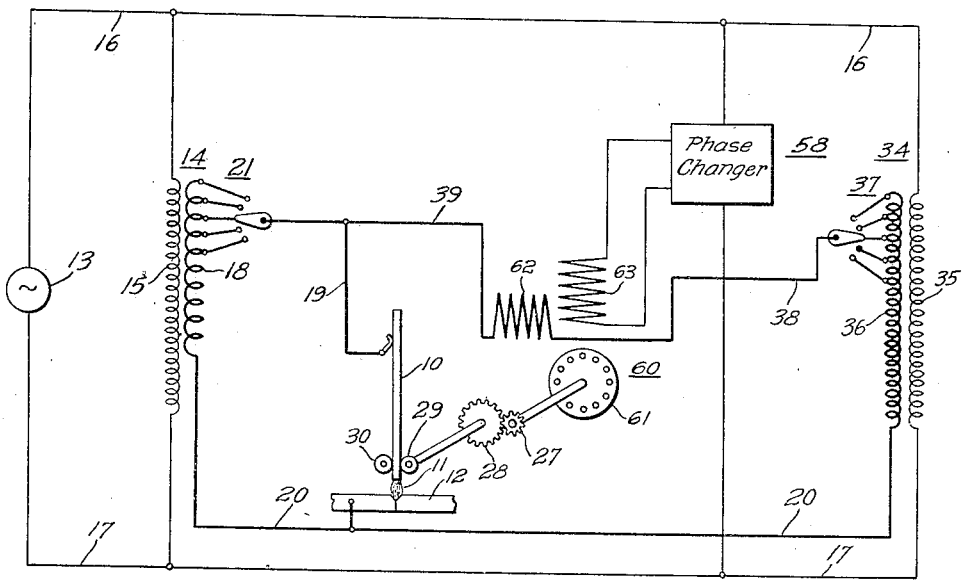
Figure 5:
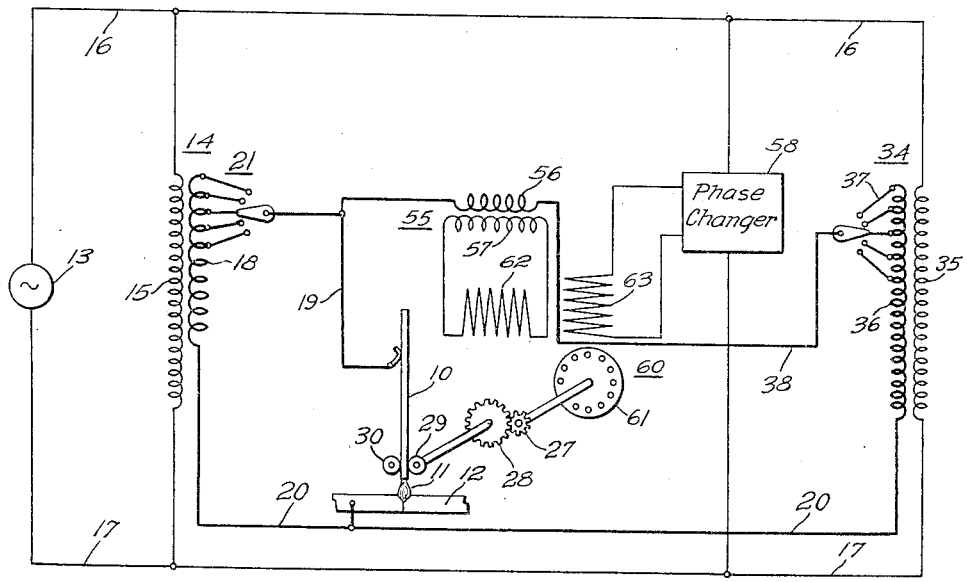

For a more complete understanding of the nature and scope of our invention, reference may be had to the following detailed description, when taken in connection with the accompanying drawings, in which:

Figures 1, 2 and 3 illustrate diagrammatically automatic alternating-current arc welding systems in which an alternating-current motor of the commutator type is used for feeding a welding electrode relative to work; and Figs. 4 and 5 illustrate diagrammatically automatic alternating-current arc welding systems in which an alternating-current motor of the polyphase squirrel-cage type is used for feeding a welding electrode relative to the work.

Referring now particularly to Fig. 1 of the drawings, the reference character 10 designates a welding electrode of any suitable type, such as a bare metallic electrode, a fluxed or covered electrode, or a carbon electrode which may be fed to maintain an arc 11 between it and work 12 on which a welding operation is to be performed.

According to this invention, the arc 11 is an alternating-current arc which is maintained from any suitable source of alternating current, such as a 60-cycle generator 13, through a transformer, shown generally at 14. The transformer 14 comprises a primary winding 15 which is connected to conductors 16 and 17, that are energized from the generator 13 and a secondary winding 18 which is connected by means of conductors 19 and 20 to the welding electrode 10 and the work 12, respectively. In order to regulate the current and voltage which are applied to the welding electrode 10 and the work 12, taps, illustrated generally at 21, are provided for operation in the customary manner.

In order to feed the welding electrode 10 relative to the work 12 so that a substantially constant arc voltage may be maintained therebetween, a motor, illustrated generally at 25, is provided as shown in Fig. 1 of the drawings. The motor 25 is of the alternating-current commutator type having an armature 26 disposed in driving engagement with the welding electrode 10 through reduction gears 27 and 28 for operating a feeding roller 29. An idler roller 30 is provided to cooperate with the feeding roller 29 in the customary manner. It will be observed that the armature 26 is directly connected to feed the electrode 10 and it is pointed out that the motor 25 is reversible so that the welding electrode 10 may be fed either forwardly or retracted to maintain a substantially constant arc voltage, as will be set forth hereinafter.

With a view to maintaining a substantially constant arc voltage between the welding electrode 10 and the work 12, an auxiliary transformer, illustrated generally at 34, is provided. The transformer 34 comprises a primary winding 35 connected to the conductors 16 and 17 and a secondary winding 36, one terminal of which is connected to the conductor 20 while the other terminal is connected through taps, illustrated generally at 37, to a conductor 38. As shown in the drawings, the armature 26 is connected between the conductor 38 and a conductor 39 which is connected to the welding electrode 10 so that the current flowing through the armature 26 is a function of the difference between the voltage maintained across the electrode 10 and the work 12 by the main transformer 14 and the voltage maintained between conductors 20 and 38 by means of the auxiliary transformer 34.

The motor 25 is provided with a field winding 42 which is connected through a capacitor 43 to the conductors 16 and 17, as illustrated. The capacitor 43 is provided in order to supply the proper phase relation between the flux generated by the winding 42 and the current flowing through the winding on the armature 26. While the motor 25 is illustrated as being separately excited, it is effectively connected as a shunt motor. As is well known, the ordinary shunt motor connected with the armature and field in parallel is useless when alternating current is applied, because the field flux lags 90 degrees behind the E. M. F., while the armature current tends to come into phase with the E. M. F. and hence go out of phase with the flux as the speed rises. To prevent this phase displacement, which would destroy the torque, it is necessary to excite the field winding by means of an E. M. F. leading substantially 90 degrees that which is applied to the armature winding.

In operation, the voltage maintained between conductors 20 and 38 is adjusted by means of the taps 37 to be less than the voltage applied to the conductors 19 and 20 when no arc is maintained between the welding electrode 10 and the work 12. The armature 26 then rotates in such a direction as to feed the electrode 10 forwardly until it comes into contact engagement with the work 12. When the work 12 is engaged, the voltage between conductors 19 and 20 is reduced to a very low value and the current flowing in the armature 26 is reversed from its former direction so that the direction of rotation of the armature 26 is reversed, thereupon retracting the welding electrode 10 until the voltage across the electrode 10 and the work 12, as maintained by the main transformer 14, becomes such a value that substantially no current flows through the armature 26. On a further rise in voltage across the electrode 10 and the work 12, as maintained by the transformer 14, the welding electrode 10 is again forwardly fed to maintain the welding arc 11 at a voltage which will be substantially constant as will be readily understood.

While in Figs. 1 through 3 of the drawings, the armature 26 of the motor 25 has been illustrated as being connected to be responsive to the difference in voltage between that maintained across the welding electrode 10 and the work 12 and the voltage supplied by the transformer 34, it will be readily apparent that the connections of the winding 42 may be interchanged with the connections to the armature 26 and that the same functioning of the system will result. It will also be apparent that various types of resistance and reactance control may be used for regulating the flow of current from the transformer 14 either in combination with or in lieu of the taps 21.

Referring now particularly to Fig. 2 of the drawings, it will be observed that the system is essentially the same as that illustrated in Fig. 1. However, in order to properly excite the field winding 42 of the motor 25, a phase shifter of the dynamo electric type, illustrated generally at 45, is provided. The phase shifter 45 may comprise a polyphase squirrel cage motor having a rotor 46 and field windings 47 and 48. A starting winding 49 is provided which may be connected through a resistor 50 in the customary manner to cooperate with the winding 48 for starting the phase shifter 45. The phase shifter 45 is essentially a two-phase motor which is connected to run as a single phase motor and may be connected to the conductors 16 and 17 for energization. The winding 47, in which a voltage is generated which is displaced 90 degrees from the voltage applied to winding 48, may be connected to excite field winding 42.

The functioning of the system illustrated in Fig. 2 of the drawings is essentially the same as that described hereinabove in connection with Fig. 1 and, hence it will not be repeated. However, it is pointed out that it may be preferable to use the phase shifter 45 of the type illustrated in Fig. 2 rather than the capacitor 43 in order to obtain more suitable operating characteristics of the system.

Referring now to Fig. 3 of the drawings, it will be observed that a transformer 55 has been provided for amplifying the difference in potential resulting from the voltage applied by the main transformer 14 and the auxiliary transformer 34. The transformer 55 comprises a primary winding 56 which is connected to be responsive to this difference in potential by being connected to conductors 38 and 39 and a secondary winding 57 which is connected to the armature 26.

A phase changer, illustrated generally at 58, is provided for exciting the field winding 42. The phase changer 58 may be of either of the types illustrated and described hereinbefore or it may be of any other suitable type which will provide the proper phase relation between the flux generated by the field winding 42 and the current flowing through the armature 26.

Referring now to Fig. 4 of the drawings, it will be observed that a motor 60 of the polyphase squirrel cage type is provided for feeding the welding electrode 10 relative to the work 12. The motor 60 comprises a rotor 61 of the well known squirrel cage type and field windings 62 and 63. The windings 62 and 63 are illustrated as being displaced from each other by 90 degrees and they are thus arranged in the motor 60, as in a 2-phase alternating current motor.

In order to control the operation of the motor 60 in accordance with the voltage across the electrode 10 and the work 12 to maintain a substantially constant arc voltage therebetween, the winding 62 is connected between conductors 38 and 39 so that the amount and direction of the current flowing through it will be a function of the difference between the voltages applied by the main transformer 14 and the auxiliary transformer 34. The winding 63 may be excited from any suitable phase changer 58, as set forth hereinbefore.

In operation, when the welding electrode 10 is not in engagement with the work 12 and no arc is maintained therebetween, the voltage applied by the transformer 14 to the winding 62 is greater than the voltage applied thereto by the auxiliary transformer 34. As a result, the rotor 61 is rotated in such a direction as to forwardly feed the welding electrode 10 until it engages the work 12. When this engagement occurs, the current flowing through the winding 62 is reversed and the rotor 61 is caused to rotate in a reverse direction to retract the welding electrode 10. The welding electrode 10 will again be forwardly fed when the voltage maintained by the transformer 14 becomes greater than that supplied by the auxiliary transformer 34.

In certain instances, it may be desirable to amplify the difference in voltage as maintained by the main transformer 14 and the auxiliary transformer 34. For this purpose, the circuit connections illustrated in Fig. 5 are provided in which the transformer 55, described hereinbefore in connection with Fig. 3, is connected to supply the amplified difference in voltage to the winding 62 of the motor 60. The operation of the system illustrated in Fig. 5 will be essentially the same as that of the system illustrated in Fig. 4 and described hereinbefore. For this reason, a description thereof will not be repeated.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. An automatic arc welding system comprising, in combination, a source of alternating current connected to maintain an arc between a welding electrode and work on which a welding operation is to be performed, and an alternating current motor having driving connection with said electrode for feeding it relative to said work, said motor being provided with a winding connected to be responsive to the arc voltage for regulating the rate at which said electrode is fed to maintain a substantially constant arc voltage, and a second winding connected to a source of alternating current, the voltage of which is displaced in phase from the voltage applied to said first winding.

2. An automatic arc welding system comprising, in combination, a source of alternating current connected to maintain an arc between a welding electrode and work on which a welding operation is to be performed, and an alternating current motor having driving connection with said electrode for feeding it relative to said work, said motor being provided with a winding connected to be responsive to the arc voltage for regulating the rate at which said electrode is fed to maintain a substantially constant arc voltage, and a second winding connected to a source of alternating current having a relatively different phase relation from the current in said first-mentioned winding to generate a flux in substantially the same phase relation as the current in said first mentioned winding.

3. An automatic arc welding system comprising in combination, a main source of alternating current connected to maintain an arc between a welding electrode and work on which a welding operation is to be performed, an auxiliary source of alternating current, and an alternating current motor having driving connection with said welding electrode, said motor being provided with a first winding connected to respond to the difference in voltage between the main and auxiliary sources of alternating current for regulating the rate at which said electrode is fed to maintain a substantially constant arc voltage, and a second winding connected to a source of alternating current the voltage of which is displaced in phase from the voltage applied to said first winding.

4. An automatic arc welding system comprising, in combination, a main source of alternating current connected to maintain an arc between a welding electrode and work on which a welding operation is to be performed, an auxiliary source of alternating current, and an alternating current motor having driving connection with said welding electrode, said motor being provided with a first winding connected to respond to the difference in voltage between the main and auxiliary sources of alternating current for regulating the rate at which said electrode is fed to maintain a substantially constant arc voltage, and a second winding connected to a source of alternating current having a relatively different phase relation from the current in said first winding to generate a flux in substantially the same phase relation as the current in said first winding.

5. An automatic arc welding system comprising, in combination, a main source of alternating current connected to maintain an arc between a welding electrode and work on which a welding operation is to be performed, an auxiliary source of alternating current disposed to supply a voltage less than the voltage maintained by the main source of alternating current across the welding electrode and the work, and an alternating current motor having driving connection with said electrode, said motor being provided with a first winding connected to respond to the difference in voltage between the main and auxiliary sources of alternating current for forwardly feeding said electrode toward the work when the voltage across the electrode and the work is higher than the voltage supplied by the auxiliary source of alternating current and retracting said electrode from the work when the voltage across the electrode and the work is lower than the voltage supplied by the auxiliary source of alternating current, and a second winding connected to a source of alternating current the voltage of which is displaced in phase from the voltage applied to said first winding.

6. An automatic arc welding system comprising, in combination, a main source of alternating current connected to maintain an arc between a welding electrode and work on which a welding operation is to be performed, an auxiliary source of alternating current disposed to supply a voltage of less magnitude than the voltage maintained by the main source of alternating current across the welding electrode and the work, and an alternating current motor having driving connection with said electrode, said motor being provided with a first winding connected to respond to the difference in voltage between the main and auxiliary sources of alternating current for forwardly feeding said electrode toward the work when the voltage across the electrode and the work is higher than the voltage supplied by the auxiliary source of alternating current and retracting said electrode from the work when the voltage across the electrode and the work is lower than the voltage supplied by the auxiliary source of alternating current, and a second winding connected to a source of alternating current having a relatively different phase relation from the current in said first winding to generate flux in substantially the same phase relation as the current in said first winding.

7. An automatic arc welding system comprising, in combination, a main source of alternating current connected to maintain an arc between a welding electrode and work on which a welding operation is to be performed, an alternating current motor of the commutator type having driving connection with said electrode, said motor being provided with a separately excited field winding and an armature connected to be responsive to the arc voltage for regulating the rate at which said electrode is fed to maintain a substantially constant arc voltage, and a second source of alternating current having a relatively different phase relation from the alternating current supplied by said main source connected to energize said separately excited field winding for generating flux in substantially the same phase relation as the current in said armature.

8. An automatic arc welding system comprising, in combination, a main source of alternating current connected to maintain an arc between a welding electrode and work on which a welding operation is to be performed, an auxiliary source of alternating current, an alternating current motor of the commutator type having driving connection with said welding electrode, said motor being provided with a separately excited field winding and an armature connected to be responsive to the difference in voltage between the main and auxiliary sources of alternating current for regulating the rate at which said electrode is fed to maintain a substantially constant arc voltage, and a capacitor, said separately excited field winding being connected in series circuit relation with said capacitor to be energized from a source of energy common to said main and auxiliary alternating current sources to generate a flux in substantially the same phase relation as the current in said armature.

9. An automatic arc welding system comprising, in combination, a main source of alternating current connected to maintain an arc between a welding electrode and work on which a welding operation is to be performed, an auxiliary source of alternating current, an alternating current motor of the commutator type having driving connection with said welding electrode, an armature in said motor connected to be responsive to the difference in voltage between the main and auxiliary sources of alternating current for regulating the rate at which said electrode is fed to maintain a predetermined arc voltage, a main field winding disposed in said motor, and a phase changer comprising a polyphase dynamo-electric device connected to be energized from a source of energy common to said main and auxiliary alternating current sources, one of the windings of said polyphase dynamo-electric device being disposed and connected to energize said main field winding to generate flux in substantially the same phase relation as the current in said armature.

10. An automatic arc welding system comprising, in combination, a main source of alternating current connected to maintain an arc between a welding electrode and work on which a welding operation is to be performed, an auxiliary source of alternating current, an alternating current motor of the commutator type having driving connection with said welding electrode, an armature disposed in said motor, a transformer having a secondary winding of relatively large number of turns connected to said armature and a primary winding of relatively small number of turns connected to be responsive to the difference in voltage between the main and auxiliary sources of alternating current whereby the operation of said armature is controlled for regulating the rate at which said electrode is fed, and a main field winding disposed in said motor and connected to a source of alternating current having a relatively different phase relation from the current in said armature to generate flux in substantially the same phase relation as the current in said armature.

11. An automatic arc welding system comprising, in combination, a main source of alternating current connected to maintain an arc between a welding electrode and work on which a welding operation is to be performed, an auxiliary source of alternating current, an alternating current motor having driving connection with said welding electrode, a first winding disposed in said motor, amplifying means connected to be responsive to the difference in voltage between the main and auxiliary sources of alternating current and to apply the amplified difference in voltage to said first winding to effect the control of the operation of said motor to feed said electrode relative to said work to maintain the arc voltage therebetween at a predetermined value, and a second winding disposed in said motor and connected to a source of alternating current the voltage of which is displaced in phase from the voltage applied to said first winding.

12. An automatic arc welding system comprising, in combination, a main source of alternating current connected to maintain an arc between a welding electrode and work on which a welding operation is to be performed, an auxiliary source of alternating current, an alternating current motor of the polyphase squirrel-cage type having driving connection with said welding electrode, a first field winding disposed in said motor and connected to be responsive to the difference in voltage between the main and auxiliary sources of alternating current for regulating the rate at which said electrode is fed to maintain a predetermined arc voltage, and a second field winding disposed in said motor and connected to a source of alternating current the voltage of which is displaced in phase from the voltage applied to said first field winding.

13. An automatic arc welding system comprising, in combination, a main source of alternating current connected to maintain an arc between a welding electrode and work on which a welding operation is to be performed, an auxiliary source of alternating current, an alternating current motor of the polyphase squirrel-cage type having driving connection with said welding electrode, said motor being provided with a plurality of field windings and a transformer having a secondary winding of a relatively large number of turns connected to one of said field windings, and a primary winding of a relatively small number of turns connected to be responsive to the difference in voltage between the main and auxiliary sources of alternating current whereby the operation of said motor is controlled for regulating the rate at which said electrode is fed, said other field winding being connected to a source of alternating current the voltage of which is displaced in phase from the voltage applied to said first field winding.

JOHN H. BLANKENBUEHLER.
OLIVER C. SCHOENFELD.